United States Patent [19]
Fish

[11] Patent Number: 6,035,294
[45] Date of Patent: Mar. 7, 2000

[54] WIDE ACCESS DATABASES AND DATABASE SYSTEMS

[75] Inventor: Robert D. Fish, La Habra, Calif.

[73] Assignee: Big Fat Fish, Inc., Fullerton, Calif.

[21] Appl. No.: 09/128,116

[22] Filed: Jul. 3, 1998

[51] Int. Cl.[7] ................................................. G06F 17/30
[52] U.S. Cl. ............................... 707/2; 707/10; 709/204
[58] Field of Search ........................... 707/2, 10; 709/204

[56] References Cited

U.S. PATENT DOCUMENTS

| | | | |
|---|---|---|---|
| 5,625,818 | 4/1997 | Zarmer et al. | 364/282.4 |
| 5,684,945 | 11/1997 | Chen et al. | 714/20 |
| 5,793,966 | 8/1998 | Amstein et al. | 709/203 |
| 5,799,151 | 8/1998 | Hoffer | 709/204 |
| 5,819,092 | 10/1998 | Ferguson et al. | 395/701 |
| 5,920,852 | 7/1999 | Graupe | 706/26 |

*Primary Examiner*—Wayne Amsbury
*Attorney, Agent, or Firm*—Robert D. Fish; Crockett & Fish

[57] ABSTRACT

A self-evolving generic index for storing marketplace information for multiple types of items allows users to add new parameters, values and possibly new classifications for use in describing items. The new parameters/values/classifications can then be selected by other users for use in describing their own items. It is especially contemplated that the system can display information relating to the usage with which parameters/values/classifications have historically been employed in describing different types of items. This encourages users to be consistent in selecting parameters/values/classifications for both entering and searching data, while still allowing great flexibility.

13 Claims, 8 Drawing Sheets

110 — PROMETHEUS
Classification Index

ENTER ITEM DESCRIPTION: Sport Utility Vehicles — 134

| | MAJOR CLASS | MINOR CLASS | ITEM | FREQ |
|---|---|---|---|---|
| | Automobiles | | | |

| | | | | |
|---|---|---|---|---|
| √ | Automobiles | Used Vehicles | Sport Utility Vehicles | 99 |
| | Automobiles | Sport Utility Vehicles | Jeeps | 2 |
| | Automobiles | Sport Utility Vehicles | Montero | 1 |
| | | | | |
| * | | | | |

GO TO: MAIN - GEO INDEX - ITEM DETAIL - VENDORS

*FIG. 3B*

110 — PROMETHEUS
Classification Index

ENTER ITEM DESCRIPTION: Chip — 134

| | MAJOR CLASS | MINOR CLASS | ITEM | FREQ |
|---|---|---|---|---|
| √ | | | | |
| | | | | |

| | | | | |
|---|---|---|---|---|
| | Food | Potatoes | Potato chips | 93 |
| | Games | Board games | Casino chips | 47 |
| | Building materials | Wood | Wood chips | 45 |
| | Building materials | Metal | Metal chips | 32 |
| * | | | | |

GO TO: MAIN - GEO INDEX - ITEM DETAIL - VENDORS

*FIG. 3C*

PROMETHEUS — 110
Geographic Index — 144

ENTER GEOGRAPHIC DESCRIPTION: Princeton

| REGION | MARKET | SUBMARKET | FREQ |
|---|---|---|---|
| | | | |

| | | | |
|---|---|---|---|
| United States | Greater NY | Princeton | 95 |
| Europe | Great Britain | Princeton | 14 |
| United States | Maine | Princeton | 12 |
| New Jersey | Princeton | University | 1 |
| * | | | |

GO TO: MAIN - ITEM INDEX - ITEM DETAIL - VENDORS

*FIG. 4*

| MEASUREMENTS | |
|---|---|
| M# | Measurement |
| 1 | Distance |
| 2 | Weight |
| 3 | Count |
| 4 | Money |
| 5 | Time |

*FIG. 5A*

| PARAMETERS | |
|---|---|
| P# | Parameter Description |
| 1 | Make |
| 2 | Model |
| 3 | Year |
| 4 | Color |
| 5 | Odometer reading |
| 6 | Condition |
| 7 | Price |
| 8 | Location |

*FIG. 5B*

| UNITS | | | |
|---|---|---|---|
| U# | Units Name | M# | Relationship |
| 1 | Meters | 1 | 1 |
| 2 | Millimeters | 1 | .001 |
| 3 | Centimeters | 1 | .01 |
| 4 | Kilometers | 1 | 1000 |
| 5 | Feet | 1 | 1 |
| 6 | Inches | 1 | 0.083333 |
| 7 | Miles | 1 | 5280 |
| 8 | Kilogram | 2 | 1 |
| 9 | Gram | 2 | .001 |
| 10 | Milligram | 2 | .000001 |
| 11 | Kilogram | 2 | 1000 |
| 15 | Dollars | 4 | 1 |
| 16 | Cents | 4 | 0.01 |
| 17 | Marks | 4 | 0.65 |

*FIG. 5C*

| VALUES | | |
|---|---|---|
| VA# | VALUE | U# |
| 1 | 5200 | 15 |
| 2 | 1799 | 15 |
| 3 | 2450 | 15 |
| 4 | Red | |
| 5 | Ford | |
| 6 | Fairmont | |
| 7 | 89 | 8 |
| 8 | Good | |

*FIG. 5D*

VENDORS

| VN# | Primary Name | Secondary Name | Tertiary Name | Password |
|---|---|---|---|---|
| 1 | Smith | Bill | | XYZ |
| 2 | Furgessun Company | | | 123 |
| 3 | Tom's Donuts | | | |

Figure 5E

BRANCHES

| BR# | VN# | Branch ID | Address | City | State | Country | Telephone | Fax | E-Mail |
|---|---|---|---|---|---|---|---|---|---|
| 1 | 2 | Main | 20 S. Broad | Fullerton | California | USA | 714-555-9911 | 714-555-9912 | furgessun.com |
| 2 | 2 | Los Angeles | 611 W. Fifth | Los Angeles | California | USA | 213-555-1234 | 213-555-1235 | |
| 3 | 1 | | 151 Main | Irvine | California | USA | | | |
| 4 | 3 | | | | | | | | tdonuts.com |

Figure 5F

MAIN DATA TABLE (could be multiple tables)

| E# | L3# | G3# | DATE | BR# | P1# | V1# | P2# | V2# | P3# | V3# | P4# | V4# | P5# | V5# | P6# | V6# | P7# | V7# | P8# | V8# |
|---|---|---|---|---|---|---|---|---|---|---|---|---|---|---|---|---|---|---|---|---|
| 1 | 1 | | 5/5/97 | 231 | 11 | 126 | 876 | 400 | 591 | 11 | 99 | 26 | 574 | 342 | 54 | 82 | 345 | 112 | 123 | 933 |
| 2 | 1 | | 5/5/97 | 11 | 45 | 322 | 34 | 653 | 165 | 221 | 578 | 845 | 232 | 126 | 788 | 356 | 951 | 22 | 123 | 65 |
| 3 | 1 | | 5/1/97 | 45 | 71 | 23 | 78 | 126 | 68 | 985 | 65 | 344 | 453 | 23 | 87 | 643 | 366 | 632 | 67 | 779 |
| 4 | 1 | | 5/1/97 | 611 | 71 | 174 | 23 | 543 | 45 | 6 | 68 | 990 | 777 | 45 | 342 | 665 | 460 | 921 | 844 | 458 |
| 5 | 154 | | 4/3197 | 175 | 12 | 8 | 111 | 765 | 100 | 199 | 200 | 201 | 295 | 112 | 98 | 412 | 40 | 78 | 999 | 32 |
| 6 | 154 | | 4/30/97 | 144 | 19 | 378 | 232 | 996 | 798 | 45 | 555 | 786 | 86 | 100 | 199 | 45 | 32 | 61 | 16 | 7 |

Figure 5J

| LEVEL 1 OF ITEM HIERARCHY | | |
|---|---|---|
| L1# | MAJOR FIELD | L1 FREQUENCY |
| 1 | Advertising | 12343 |
| 2 | Air Conditioning | 44433 |
| 3 | Ambulance | 221 |
| 4 | Answering Service | 2218 |
| 5 | Appliances | 73122 |
| 6 | Attorneys | 1244 |
| 7 | Automobiles | 4532 |
| 8 | Banks | 33334 |
| 9 | Boats | 1234 |

*FIG. 5G*

| LEVEL 2 OF ITEM HIERARCHY | | | |
|---|---|---|---|
| M1# | MINOR FIELD | L1# | L2 FREQUENCY |
| 1 | Sport Utility Vehicles | 8 | 54321 |
| 2 | Passenger Cars | 8 | 85216 |
| 3 | Station Wagons | 8 | 342 |

*FIG. 5H*

| LEVEL 3 OF ITEM HIERARCHY | | | | |
|---|---|---|---|---|
| IH3# | L3 Name | L1# | L2# | L3 FREQUENCY |
| 1 | Jeep | 1 | 8 | 3431 |
| 2 | Montero | 1 | 8 | 1345 |

*FIG. 5I*

| MAIN FREQUENCY TABLE | | | | |
|---|---|---|---|---|
| F# | L3# | P# | VA# | Freq |
| 1 | 1 | 1 |  | 523 |
| 2 | 1 | 1 | 23 | 200 |
| 3 | 1 | 1 | 32 | 199 |
| 4 | 1 | 1 | 445 | 1 |
| 5 | 1 | 1 | 5 | 23 |
| 6 | 2 | 2 |  | 12 |
| 7 | 2 | 3 | 34 | 12 |
| 8 | 4 | 1 |  | 94 |
| 9 | 4 | 5 | 23 | 32 |
| 10 | 4 | 5 |  | 62 |
| 11 | 5 | 7 |  | 56 |
| 12 | 5 | 23 | 43 | 56 |

FIG. 5K

WIDE ACCESS DATABASES AND DATABASE SYSTEMS

BACKGROUND OF THE INVENTION

This invention relates to the field of wide access databases.

BACKGROUND

The Internet is by now the world's largest computer network, interconnecting millions of computers. One side effect of this large size is that the vast amount of information available on the Internet is often extremely difficult to access. Similar problems tend to occur on any wide access network, and in this discussion the Internet is used merely as an example of a wide access network.

Several attempts have been made to index the Internet, but each of these attempts has fallen short. One of the earliest attempts was to alphabetically index the names (URL addresses) of Internet users. Unfortunately, such an index is little more than an electronic "white pages," and is generally only useful if one knows the exact name or address of the user to be contacted. A straight alphabetical index also provides little or no ability to access information by subject matter, unless the name happens to include an indication of the subject matter, as in "Bob's Pharmacy." These shortcomings can be quite annoying when the amount of information is relatively small, and present profound difficulties as the amount of information grows.

Another attempt at indexing information on the Internet relies upon keywords. In keyword indices, users enter information into a freeform text field, and then the system, the system manager, or the user indexes key words found in the text. A considerable amount of scientific information is presently indexed in keyword indices such as Medline™. Although advantageous relative to URL indices, keyword indices are still impractical where the subject matter does not lend itself to keyword indexing. For example, if one is looking for a red colored automobile in a used car index, a keyword index would only be useful to the extent that all red cars are indexed according to the color red. Cars indexed as rose or magenta, crimson, ruby, vermilion or scarlet would not be located by a search for "red." Moreover, as the number of records grows, keyword indices have seriously diminishing usefulness. For example, it does little good to conduct a search for red automobiles if the database locates 5000 records for red automobiles.

Still another attempt at indexing information on the Internet relies upon the use of specialty indices. In specialty indices the subject matter on a given database is limited to a particular type of product or service, and parameters are provided which specifically relate to that subject matter. Thus, a specialty real estate index may store data according to the parameters of property type (commercial, residential, undeveloped land, etc.), location, square footage, number of bedrooms, number of baths, style (Mediterranean, Cape Code, traditional, etc.), and price. Additional information may also be allowed in a comment or image field, but such information is typically not searchable or sortable, and is difficult to standardize. In addition, specialty indices are unable to properly handle multiple types of items, i.e., items which are generally described using inconsistent or otherwise different parameters. Thus, a real estate index is very poorly adapted for storing information relating to clothes or automobiles because the data parameters required for these items are almost completely inconsistent with the parameters useful for real estate.

One technique which has proven useful for organizing information relating to multiple types of items in a generic index is a hierarchical "yellow pages." Thus, for example, the Big Book™ collects together Internet addresses for various categories such as attorneys, bookkeepers, florists and so on. The Big Book™ also indexes Internet addresses according to geographical location. Thus, one can select family law attorneys in Miami, rather than all attorneys, or all family law attorneys throughout the country. Despite these advantages, the "yellow pages" type of index is still not particularly useful where the subject matter one is searching for is not well categorized, or where the categories are vague or counterintuitive. For example, if one is searching for zipper manufacturers, a "yellow page" type index may not have any categories specifically for zippers, or zippers may be listed under some obscure category such as "interlocking clothing connectors." Still further, such indices are notoriously cumbersome when searching for related products. For example, if one is searching for all types of clothing connectors, a "yellow pages" type of index may require separate searches for zippers, buttons, snaps, etc.

Similar problems exist with respect to limiting the searches by geographical location. For example, an index may well have categories for continents, countries, major metropolitan markets, or even specific cities, but a user must still discover on his own how the database treats a particular address such as "upstate" New York. In short, unless a user knows how the index is organized, it may be nearly impossible to find desired information in a convenient manner.

A better solution for organizing information in a generic index involves hierarchical sorting of products and services as is done by Netscape™ and others. In a hierarchical index one can begin with a high level category, and then logically work down to a lower level category by selecting choices from various menus. Thus, in selecting patent attorneys one might sequentially choose the following categories: Services (level 1), Business (level 2), Legal (level 3), Attorneys (level 4), and finally Patent (level 5). The same strategy can also be applied to geographical locations. One may, for example, select Los Angeles by choosing North America (level 1), United States (level 2), California (level 3), Southern California (level 4) and Los Angeles (level 5).

Even generic indices which select records hierarchically, however, are unsatisfactory for accessing huge amounts of information. One problem is that presently known hierarchical indices do not allow users to select smaller subsets of records, and to sort the selected records, based upon parameters having particular meaning for the field being searched. A search in the field of automobiles can be used to illustrate these shortcomings. If one searches a presently known Internet index for used Ford™ automobiles, one might locate thousands of cars for sale. Clearly that number is too large for a user to realistically review every listing. Even if the number of selected records could be reduced by limiting the subject matter to a particular model, or by limiting the geographical location to a particular city, there might still be several hundred cars for sale, and it would be a terrible waste of time to scan through each of those records if the user is only looking for cars with purchase prices of less than $3000. Specialty indices may allow a user to limit the search by price, color, body style, and other parameters all at the same time, but that capability is not available on generic indices which additionally cover other types of items, such as real estate and computers.

Even if generic indices could be developed that use different sets of parameters for different products, the creation costs of such an index would be enormous. There are millions of different types of products and services that need to be indexed, and if each type has five to ten different parameters, one would have to enter tens of millions of parameter-type pairs. This would be unrealistic not only from a labor standpoint, but also because it would be impossible for any given developer to understand all the different parameters applicable to all the different types of products. It is unclear, for example, just what appropriate parameters would be for various "chat rooms". Only those individuals having interests in the relevant subject matters would likely know what parameters are best to use. Moreover, the parameters that are best for one person may be unsuitable for another person, and the most suitable parameters for any given subject matter may even change over time. In short, as marketplaces throughout the world evolve, it would continue to be unrealistic for any given developer to keep up with the evolution of desired parameters.

Thus, there is a continuing need to provide a generic index that can effectively handle multiple types of products having multiple parameters.

SUMMARY OF INVENTION

The present invention provides a self-evolving generic index for storing marketplace information for multiple types of items. The index is self-evolving in that users can add new parameters for use in describing items, and the new parameters can then be selected by other users for use in describing their own items.

In preferred embodiments parameters are not tied exclusively to particular types of items, but can instead be used with different types of items. Thus, the parameter, color, may be used to describe such diverse items as automobiles, shoes and telephones. In more preferred embodiments the system displays information relating to the usage with which parameters have historically been employed in describing different types of items. This encourages users to be consistent in selecting parameters for both entering and searching data, while still allowing great flexibility. In still more preferred embodiments the system also displays information relating to the usage with which data values have historically been used with particular parameters in describing specific types of items. This further encourages users to be consistent in selecting data values for both entering and searching data, while still allowing great flexibility.

Various objects, features, aspects and advantages of the present invention will become more apparent from the following detailed description of preferred embodiments of the invention, along with the accompanying drawing, in which like items are represented by like numerals.

DETAILED DESCRIPTION

Figure 1:
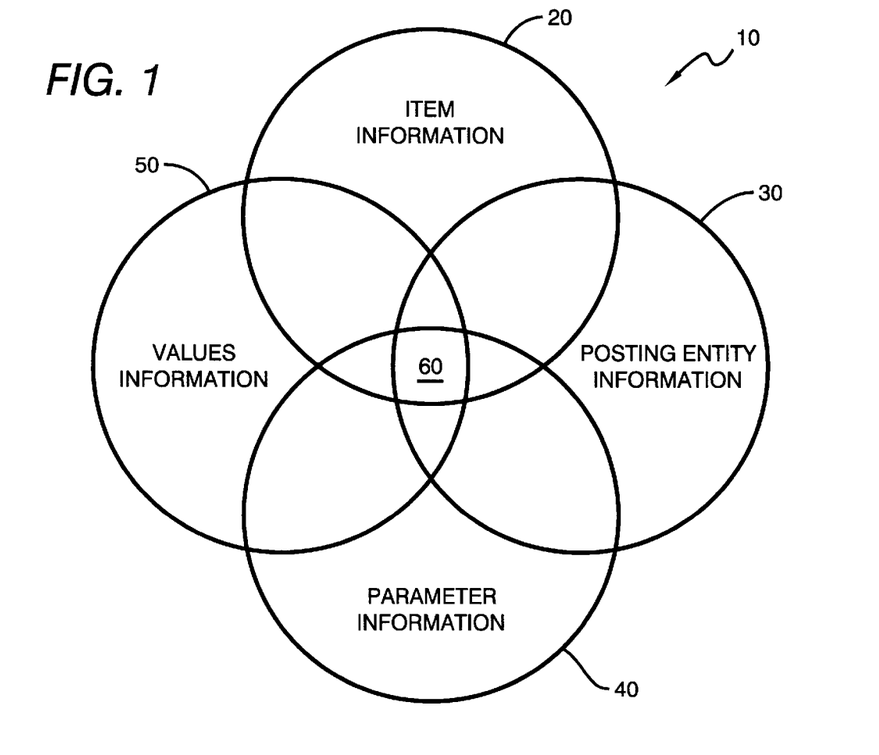
FIG. 1 is Venn diagram of data in a preferred database according to the present invention.

In FIG. 1 a preferred database 10 generally includes four intersecting sets of information: item information 20, posting entity information 30, parameter information 40 and values information 50. The intersection 60 of these sets 20, 30, 40, 50 represents records of particular interest to a user.

Figure 2:
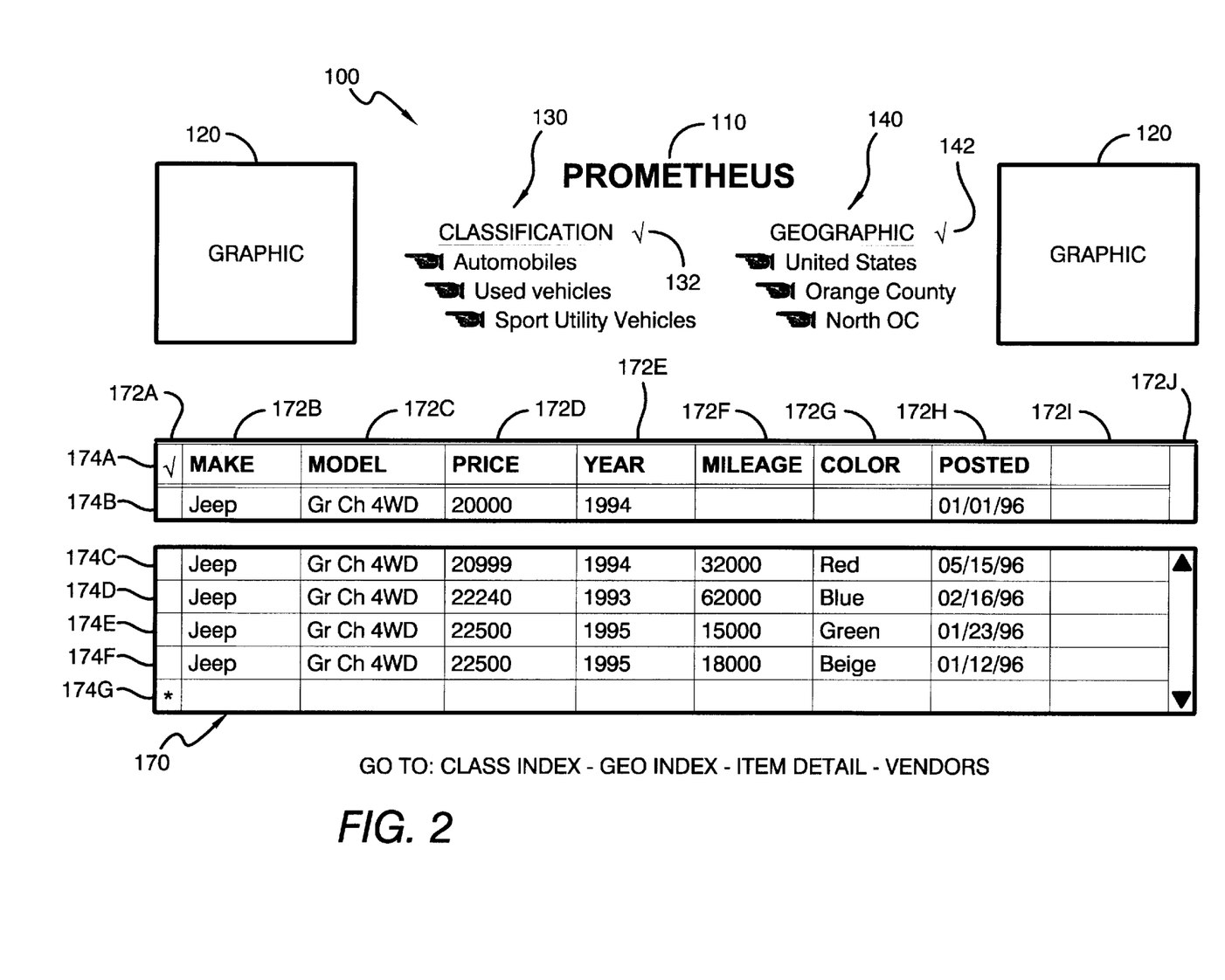
FIG. 2 is a schematic of a preferred data interface screen for use with an index according to one aspect of the present invention.

In FIG. 2 a preferred data interface screen 100 generally comprises a title 110, advertising or other graphics 120, an item classification hierarchy 130, a market hierarchy 140, and a data selection and display matrix 170.

Title 110 is used for identification purposes only, and is completely optional. Here, the name PROMETHIUS is used to identify the database, but any suitable trademark or descriptive name may be used.

The advertising or other graphics 120 are again entirely optional, and are shown here merely for the sake of exemplification. On the other hand, it is contemplated that advertising space may be sold to vendors as a significant source of funding, and that such advertising may be context sensitive to increase its value to vendors. Thus, for example, when a user is viewing information on airline fares, the graphics 120 may advantageously display advertising for an airline. Similarly, when a user is viewing information on automobiles in Los Angeles, the graphics 120 may advantageously display advertising for a Los Angeles area automotive dealer.

Item classification hierarchy 130 is advantageously 3 to 5 levels deep, and is preferably arranged in a logical manner to provide convenient access to users. In the particular example of FIG. 1, the user has selected "Automobiles" as the first or "highest" level, "Used vehicles" as the second level, and "Sport Utility Vehicles" as the third level. There are innumerable ways to establish and maintain classifications for these various levels, but at the inception of a database or database system, it is contemplated that preset classifications will be established for at least the first two levels, and preferably the first three levels. Optionally, however, it is contemplated that item classifications on every level can be open to supplementation by users as described below.

In one contemplated embodiment, each level of the item hierarchy may have a drop down menu that presents an alphabetic list of choices. Thus, for example, the highest level of the item hierarchy may include the following choices: Advertising, Air Conditioning, Ambulance, Answering Service, Appliances, Attorneys, Automobiles, Banks, Boats, etc. Choices in the second level would then depend on what choice is picked at the first level. For example, the second level choices under Automobiles may include: New Parts, New Vehicles, Used Parts, Used Vehicles. In the same manner, choices in the third level would depend on what choice is picked at the second level. Continuing with this example, third level choices under Used Vehicles may include Passenger Cars and Sport Utility Vehicles.

Item selection may advantageously be accomplished on a subsidiary item selection screen by clicking on an item screen selector such as item screen selector button 132. The subsidiary item selection screen may appear as in FIGS. 3A, 3B and 3C, with FIGS. 3A and 3B corresponding to the selection of "Sport Utility Vehicles" on FIG. 2, and FIG. 2C exemplifying selection of an unrelated item, "chip".

FIG. 3A again depicts an optional title 110, a description entry field 134, and a data table 135. In this particular data table 135 has six columns: item selection column 136A, major category column 136B, minor category column 136C, item description column 136D, usage column 136E, and slider column 136F, and seven rows: title row 137A, limitation row 137B, data rows 137C–137F, and new data entry row 137G.

Figure 3A:
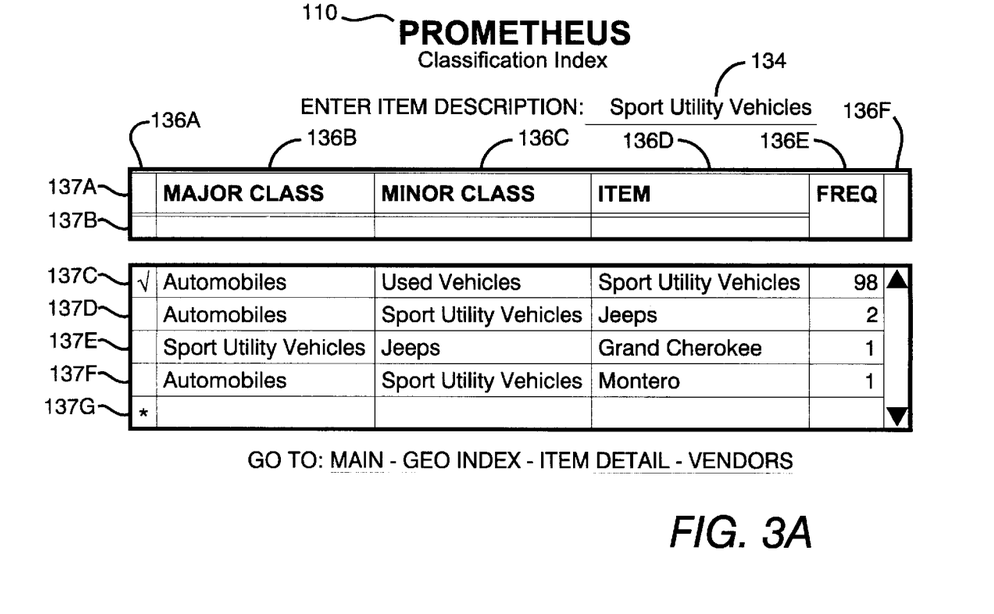
FIGS. 3A–3C are examples of a preferred item interface screen used in accordance with one aspect of the present invention.

In the preferred embodiment shown, the data rows 137C–137F are all filled in by the system based upon the description entered by the user in the description entry field 134. Subsequently, rows may advantageously be selected in which the description matches any of the major, minor or, item descriptions 136B–136D. Thus, based upon the user having entered "Sport Utility Vehicles" in description entry field 134, the system displays data row 137C in which "Sport Utility Vehicles" matches data in the item description column 136D, data rows 1137D and 137F in which "Sport Utility Vehicles" matches data in the minor category column 136C, and displays data row 137E in which "Sport Utility Vehicles" matches data in the major category column 136B. It is also contemplated that the user can enter whatever data he or she wants in new data entry row 137G, creating major, minor and item descriptions at will. What is expected to maintain general consistency throughout the system is that the user can see what categories have been chosen by others in the usage column 136E, and will presumably want to use categories that have proven to be popular in the past.

The term "usage" is employed herein in its broadest possible sense to include information relating to occurrence, absolute or relative frequency, or any other data which indicates the extent of past usage with respect to the various choices. It is contemplated, for example, that the choices for which usage information is displayed would include one or more of item classifications, geographic classifications, parameters, and values. It is also contemplated that the usage information displayed would relate to subsets of choices determined by a user's previous responses. Thus, when selecting a minor item classification, the system may display a listing of possible minor item classes determined by the user's selection of major classification, along with relative usage information among the displayed minor classes. Similarly, the item descriptions displayed, and the corresponding usage information, would preferably be a function of the major and minor item classes selected. As yet a further example, the parameters and/or values displayed, and the corresponding usage information would preferably be a function of the item selected, and possibly also of the geographic class(es) selected.

Figure 3B:
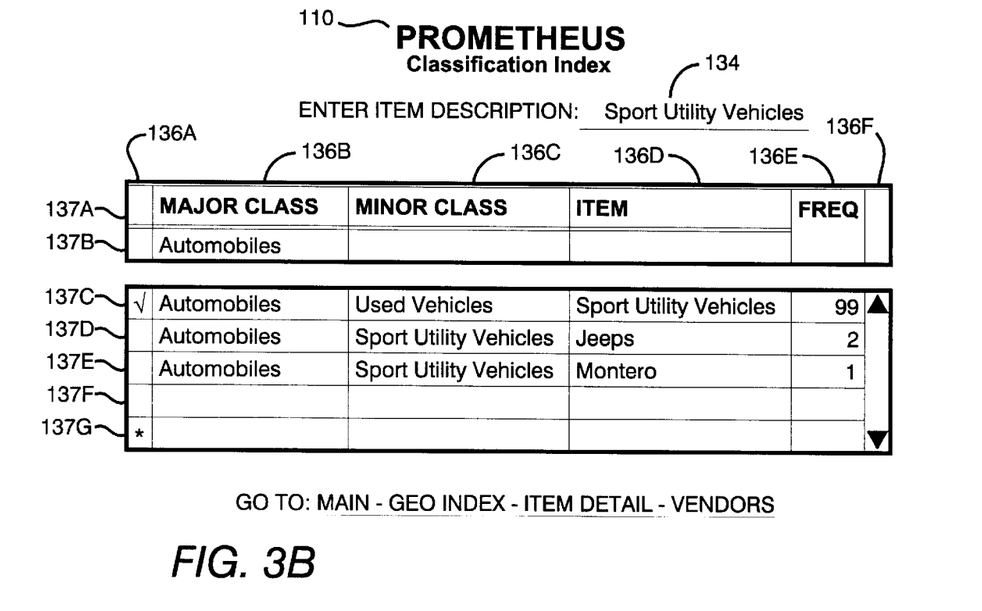
Figure 3C:
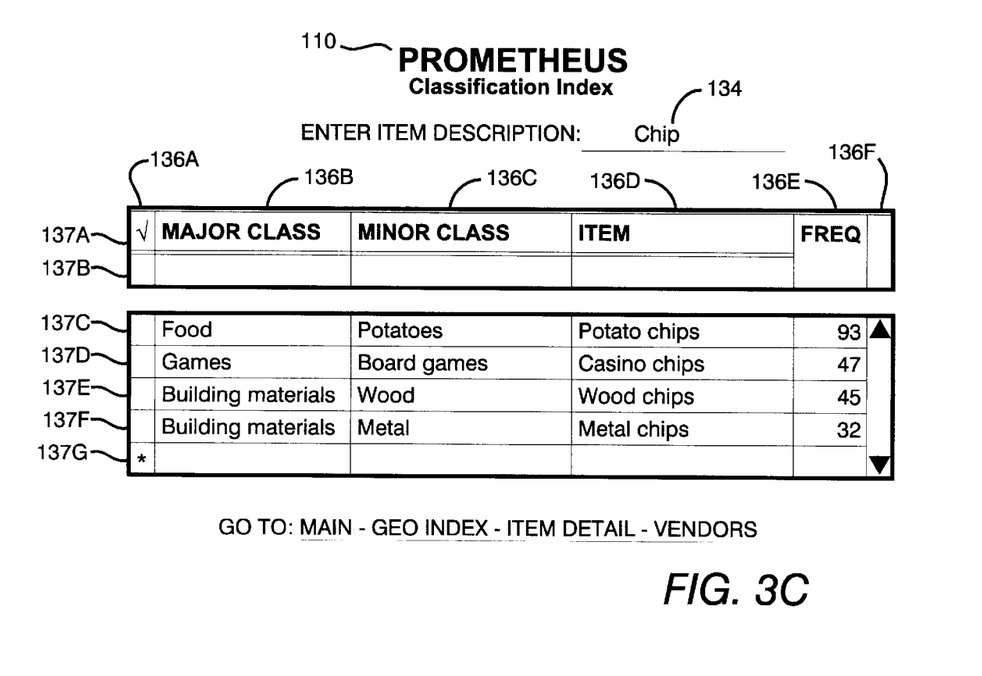

Usage information can be presented in many ways. In FIGS. 3A–3C, usage information is shown on a relative frequency scale as an integer from 1 to 100, with the data rows 137C–137F sorted from highest frequency to lowest frequency. In other embodiments, usage information can be displayed by depicting absolute frequency, by depicting occurrence of number of uses or "hits", or even by displaying data or data rows in different colors or using other identifying indicia.

Depending on the intersection between information in the data base and the data entered into the description entry field 134, there may be an unwieldy number of data rows displayed. In that instance it may be helpful for the user to limit the number of data rows by selecting one or more values for a particular major category, minor category or item description. This can be accomplished in many ways, such as with a pull down menu. In FIG. 3B, the data rows have been limited by entering the choice "Automobiles" as the major category in row 137B. This selection has limited the data in rows 137C, 137D and 137E of FIG. 3B to data that was present in rows 137C, 137D and 137F of FIG. 3A.

Also, by way of example in FIGS. 3A and 3B, the user has selected a particular value row for inclusion into the main data interface screen of FIG. 2. This has been accomplished by clicking on, or otherwise marking column 136A of row 137C in both FIGS. 3A and 3B. Presently it is contemplated that a user will select only one value row, but, of course, it is also possible that the system could be designed to accommodate selection of multiple data rows.

FIG. 3C is another example of an item hierarchy selection screen. Here, the selection interface is identical to that already described with respect to FIGS. 3A and 3B, but instead of selecting for item description "Sport Utility Vehicles", a user is selecting for item description "chip". This particular selection is instructive because there are many different types of chips, from potato chips to casino chips to various types of building materials. It is contemplated that this particular interface will allow a user to select among these choices more readily than with any previous system.

Figure 4:
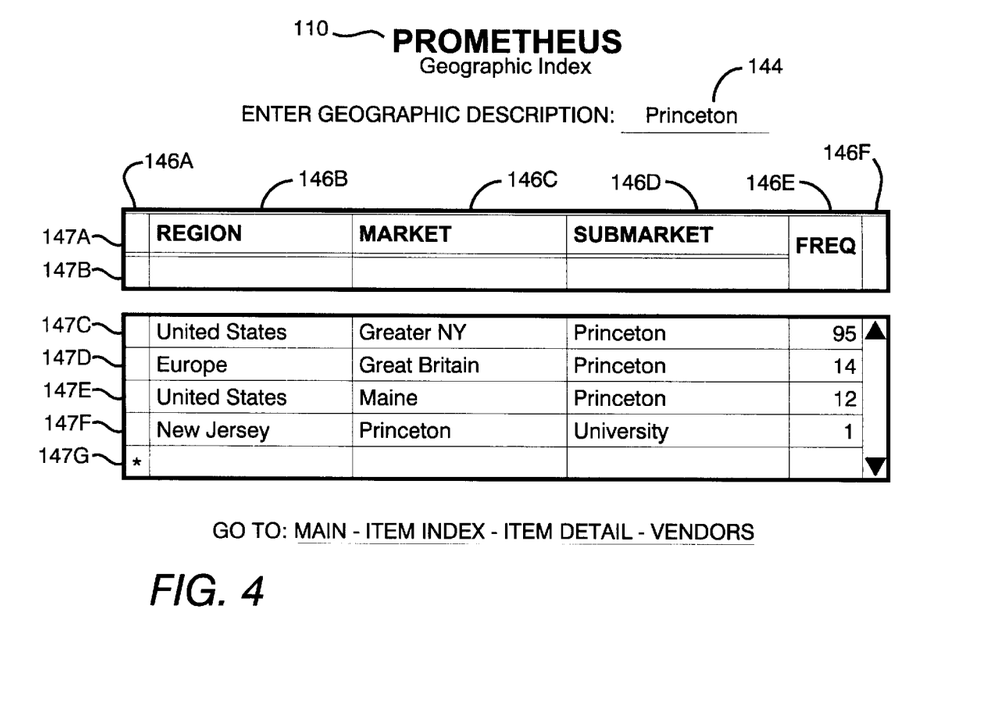
FIG. 4 is an example of a preferred geography interface screen used in accordance with one aspect of the present invention.

FIG. 4 is analogous to FIG. 3A except that major category, minor category and item description columns 136B–136D have been replaced with region category 146B, market category 146C and submarket category 146D columns. As with item classification, it is contemplated that usage information for the geographic classifications may be displayed as shown in column 146F, the display of data rows can be limited by entry or selection of data in limitation row 147B, one or more data rows can be selected in column 146A, and data from a selected row can be echoed back to the market hierarchy 140. Supporting interface screens corresponding to FIGS. 3B and 3C are also contemplated, but are not shown.

Focusing again on FIG. 2, data selection and display matrix 170 has 10 columns: a row selection column 172A, parameter columns 172B–172I, and a slider column 172J, and seven rows: header row 174A, limitation row 174B, data rows 174C–174F, and new data entry row 174G.

It is contemplated that the parameters shown in row 174A of columns 172B–172I can be selected by the user, as from a drop down menu (not shown). The drop down menu would preferably list only those parameters which have been used in the past by other users with respect to the item in item classification hierarchy 130, and would preferably list such parameters with some sort of usage information, such as was described above with respect to item and market selection in FIGS. 3A–3C and 4. In this particular example, the user has selected parameters "make", "model", "price", "year", "mileage", "color", and "posted". An eighth parameter could have been selected for column 172F, but in this example the user chose not to add an eighth parameter. Ninth and further parameters could also be selected if the system were set up to do so, and the screen could scroll left and right to conveniently accommodate additional such parameters. But it is presently contemplated that eight parameters is an optimal the maximum number of parameters. On yet another screen (not shown), or perhaps as part of the drop down parameter selection menus, or even in row 174A, the user can enter a new parameter, either one that is entirely new or one that has been used before with respect to another type of item.

Sorting can take place in any number of ways, or alternatively the data list can be non-sorted. For simplicity, it is contemplated that the data rows will be sorted according to parameters selected, and the values for the different parameters. Thus, in FIG. 2, the primary sort is the first parameter selected, (make), the secondary sort is the second parameter selected, (model), the tertiary sort is the third parameter selected, (price), and so forth.

In row 174B it is contemplated that the user can select a specific value (or a range of values where the parameter contemplates a numeric value) to limit the number of data rows. For columns where no data is entered in row 174B, the system preferably has no additional selection for the corresponding parameter.

Data rows 174C–174F present the parameter data available in the system for records that match the item hierarchy 130, the market hierarchy 140 (if given), and the various values set forth in limitation row 174B. Of course, since users may be free to load data on the system by describing items according to any parameters they see fit, data may well be unavailable for any given parameter chosen by a subsequent user. Thus, it is contemplated that the lack of data for a particular parameter would serve to limit selection only if a data value for that parameter was given by the searching user. For example, if a user looking for automobiles selected weight as a parameter, but gave no data for the weight parameter, then the system would still pull up automobiles matching the user's other criteria even if records for those automobiles did not include weight data. On the other hand, if the user selected weight as a parameter, and also gave a weight value of >4000 pounds, then only automobiles matching all other parameter value pairs, and which have weight greater than 4000 pounds would be selected.

New data row 174G can be used for entering new data, preferably up to one data value for each parameter selected. Significantly, each user will probably be limited to a maximum number of parameters, both to keep the size of the database within some sort of manageable limits, and to encourage users to employ parameters that others have used before. In this manner, each user will likely enter less than about 8–10 values for each item.

Of course, all of the above can be implemented in any number of ways, provided that the user is able to select choices based in some manner upon the usage (relative or absolute) of use of those choices by others. Nevertheless, some implementations are undoubtedly better than others, and it is contemplated that the system can be implemented as discussed below with respect to FIGS. 5A–5L.

FIGS. 5A–5D represent portions of sample tables for measurements, parameters, units, and values, respectively. The measurements table of FIG. 5A would likely be maintained by a system administrator, and would advantageously include all likely types of measurements that users would want to use. It is important to note that the term "measurements" refers to categories of measurements rather than units, or parameters for which such measurements may be employed. Thus, typical measurements are distance, weight, count, money, time, and so forth, and by way of example these particular measurements are listed as the first five records of the sample measurements table.

Figure 5A:
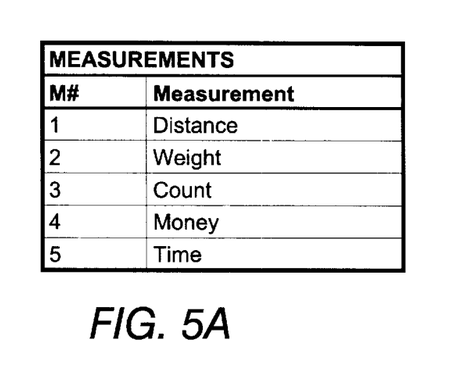
FIGS. 5A–5K are diagrams of record, table or other data structures that can be advantageously used in conjunction with an index according to the present invention.
Figure 5B:
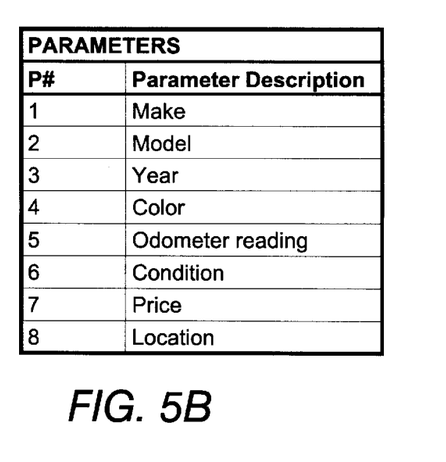

The parameters table of FIG. 5B would likely be maintained by individual users as a function of entering data as described above, and will therefore likely contain thousands of user defined parameters, all of which are used in one way or another to describe one or more items. By way of example, parameters may include make, model, year, color, odometer reading, condition, price, and so forth, and these parameters are listed as the first seven records of the sample parameters table.

Figure 5C:
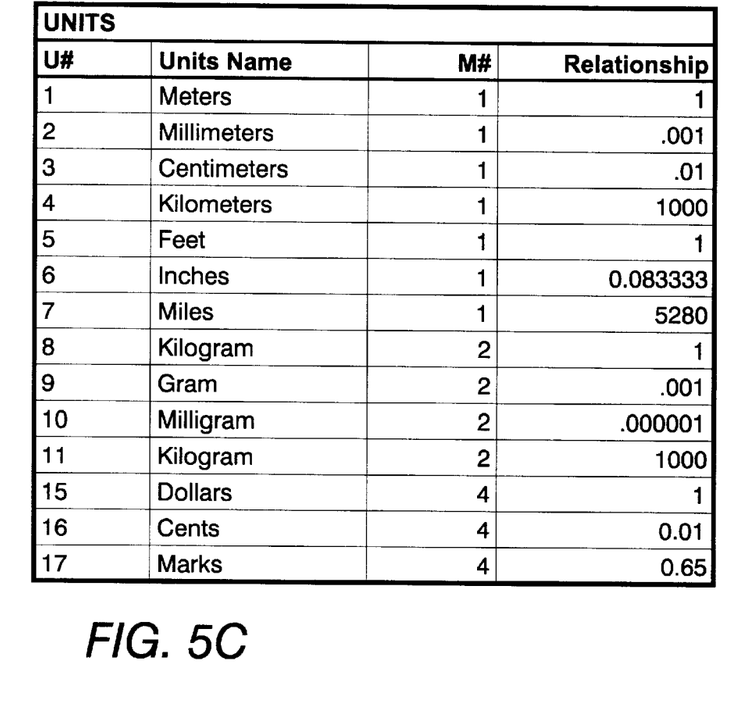

The units table of FIG. 5C would likely be maintained by a system administrator, and would advantageously include all likely types of units that users would want to use. The record number is listed in the first column, the name of the unit is given in the second column, a cross-reference to the record number of the related measurement is given in the third column, and the interrelationships among the various units in this grouping is given in the fourth column. For example, records 1 through 7 in FIG. 5C all relate to units used to describe distance, which is the first record in the measurements table of FIG. 5A. Thus, column 3 of FIG. 5C for these rows all show the numeral 1, to point to the second record in the measurements table of FIG. 5A. Similarly, records 8 through 11 in FIG. 5C all relate to units used to describe weight, which is the second record in the measurements table of FIG. 5A. Thus, column 3 of FIG. 5C for these records all show the numeral 2, to cross-reference the second record in the measurements table of FIG. 5A.

Figure 5D:
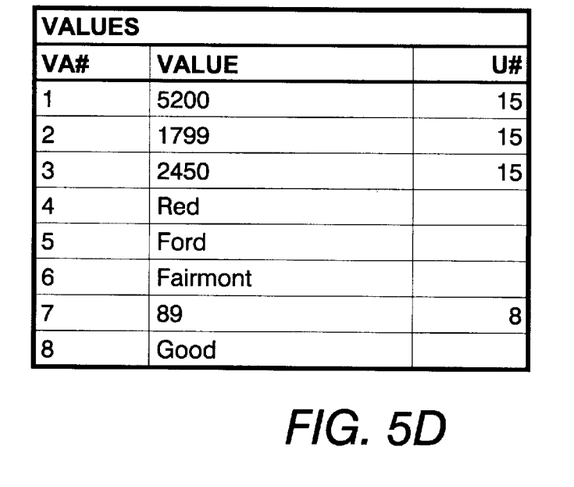

The values table of FIG. 5D would usually be maintained by individual users as a function of entering data as described above, and will therefore likely contain many thousands of user defined values. In this particular case, the value record number is listed in the first column, the literal of the value is listed in the second column, and a cross-reference to the units table of FIG. 5C is listed in the third column. In this manner, the first three data rows of FIG. 5D correspond to a value of 5200 dollars, 1799 dollars and 2450 dollars, respectively. Similarly, the fourth record corresponds to a value of "red" with no units, and the seventh record corresponds to 89 kilograms.

One may, of course, ask whether the complexity of the above-described table structure is really necessary. The answer is that such complexity is not necessary at all, but is preferred because it is operationally efficient. The system is also flexible in that it can accommodate users from many different countries, who may enter data using all sorts of different systems. Thus, the system as described herein can readily received data in meters, but display the data in miles.

Figure 5E:
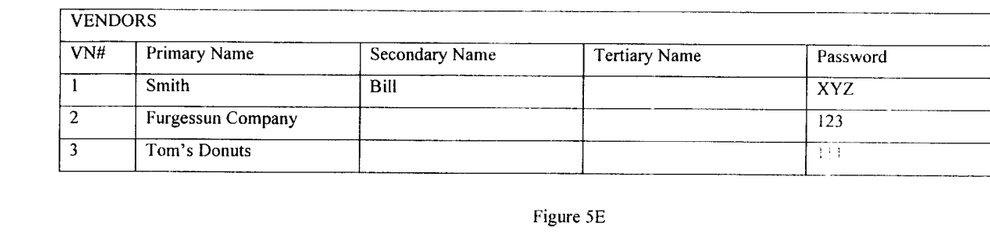
Figures 5F, 5J:
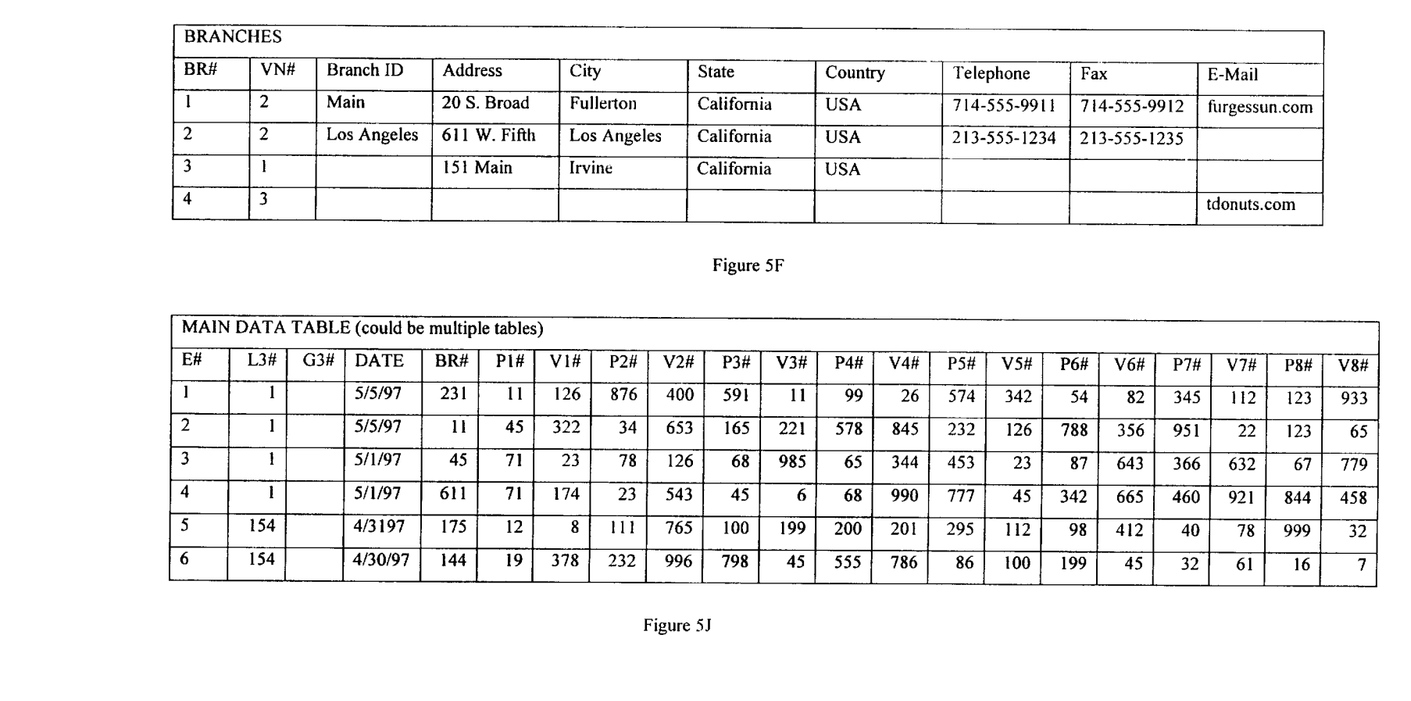

FIGS. 5E and 5F are sample tables that may be employed to store data regarding vendors, where the term "vendors" is used in its broadest possible sense to mean any person, company or other entity providing information. In many instances vendors will be those storing information on the system, and seeking a buyer. In other instances, vendors will be those merely advertising information, such as web site identifiers, but offering nothing at all for sale. In still other instances an intermediate situation may apply.

In view of the descriptions herein of the other tables, the headings of the tables in FIGS. 5E and 5F should be self explanatory. Among other things, the first column of the table in FIG. 5F is the branch record number, while the second column is a cross-reference to a vendor record number. It is contemplated that data in these tables will be entirely maintained by users, with access to individual records being limited according to a password maintained in the fifth column of the table of FIG. 5E, or by some other security arrangement.

As noted above with respect to other tables, a system using data tables of FIGS. 5E and 5F may appear overly complex. But in reality such a system is contemplated to be highly efficient. According to the data tables shown, for example, a single vendor may have many addresses linked to a single vendor name.

Figure 5G:
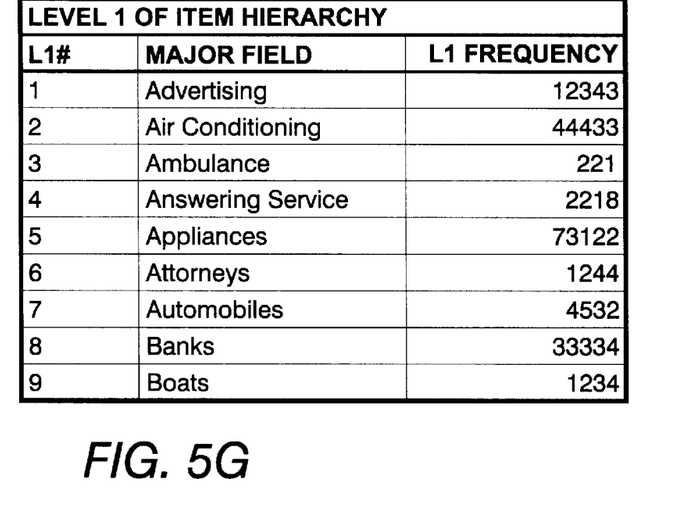
Figure 5H:
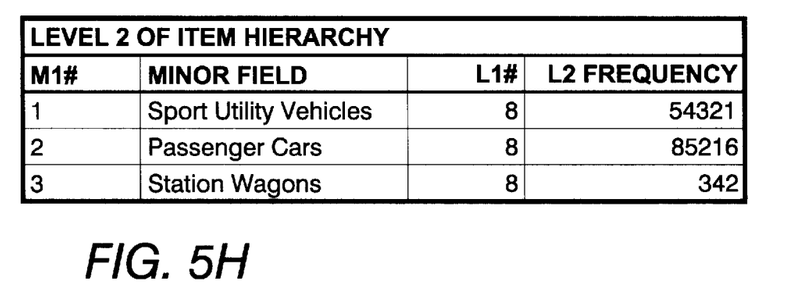
Figure 5I:
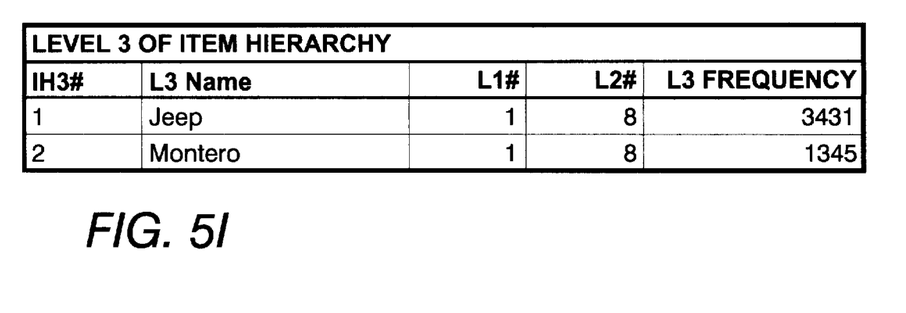

FIGS. 5G through 5I show tables containing names of major, minor and item classifications, respectively. Naturally, if there were two or four levels of item hierarchy, then two or four tables may advantageously be used. Similarly, it is possible to store the relevant information for three levels in fewer than, or more than, three tables.

The table of FIG. 5G also has a frequency of use counter in the third column, which allows the system to conveniently display actual or relative frequency of use of the various major classifications. Such frequency information may, for example, be displayed in a drop down menu in the interface of FIG. 2. The frequency information will presumably aid a user in choosing among various classifications. For example, a user might learn that the classification of Automobiles is used approximately 100 times more often than Cars, and therefore decide to choose the major classification of Automobiles.

The table of FIG. 5H contains names of minor classifications, and additionally has a cross-reference to major classification records in the third column, and a frequency of use counter in the fourth column. Using this information, the system can provide a user with relative or actual frequency information for minor classifications related to a previously chosen major classification.

The table of FIG. 5I contains names of classifications in the third (i.e., item) level, of classification. The table additionally has a cross-reference to major classification records in the third column, a cross-reference to minor classification records in the fourth column, and a frequency of use counter in the fifth column. Using this information, the system can provide a user with relative or actual frequency information for item classifications related to a previously chosen major and minor classification combination.

Another set of three tables (not shown) would also probably be employed to store names and frequency information regarding the various geographic classifications. Again, the number of tables may vary according to the number of levels used by the system.

FIG. 5J depicts the "Main" data storage table. While there are many possible configurations for storing the information shown, and while different information can be stored than that shown here, the Main data storage table is considered optimized for preferred uses. Here, column 1 contains a record number, column 2 contains a cross-reference to the level 3 item hierarchy of the table in FIG. 5I, columns 3, 4 and 5 contain cross-references to the three geographic classification levels, column 6 contains a record entry or last update date, column 7 contains a cross-reference to the branch record number of the table in FIG. 5F, and columns 8 through 25 contain cross-references to the tables in FIGS. 5B and 5D for (up to) eight parameter-value pairs. Other data may be stored as well. Examples include sunset dates upon which records will be deleted, additional usage statistics for individual records, and so forth.

There will presumably be hundreds of thousands, or even millions of records in a table such as that depicted in FIG. 5J. For operational efficiency, one might therefore split up the table into smaller tables that handle subsets, and a particularly preferred breakdown is according to level 3 items record numbers. Thus, all records with level 3 item record numbers corresponding to each major item classification may advantageously be placed in a different logical database, or even a different physical database.

Figure 5K:
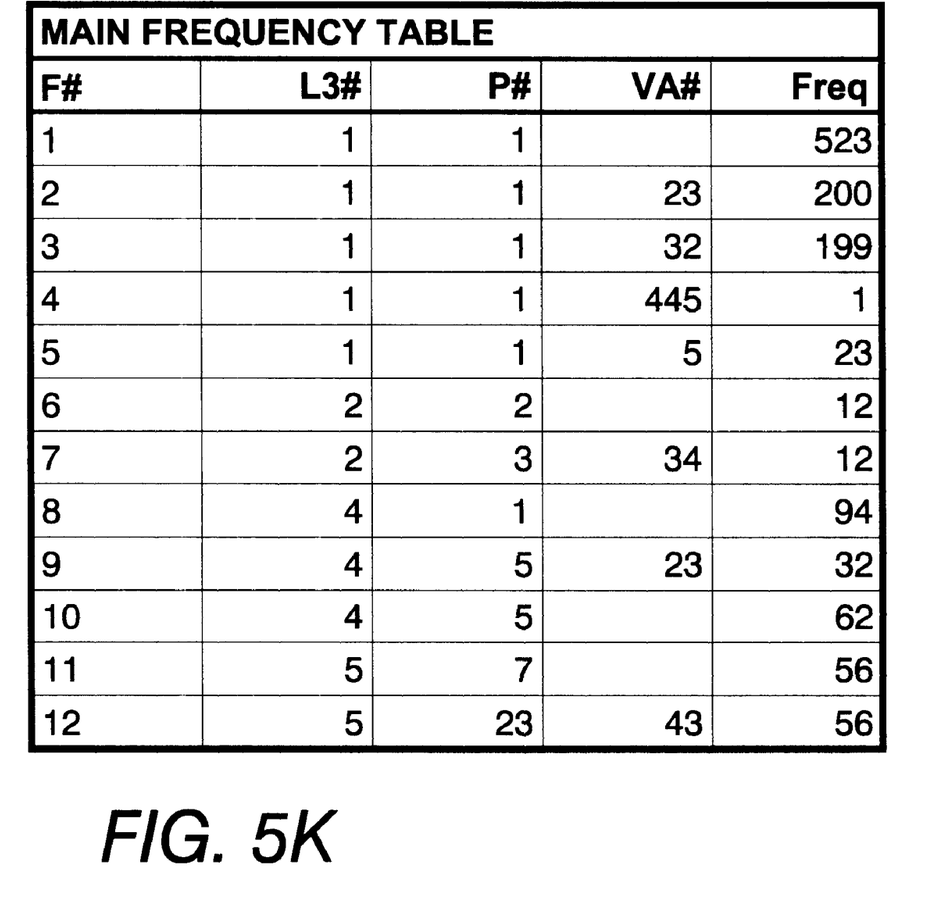

FIG. 5K contains a table that stores frequency information. In the preferred embodiment being described, column 1 contains a record identifier, column 2 contains a cross-reference to the level 3 item hierarchy of the table in FIG. 5I, column 3 contains a cross-reference to a parameter in the table in FIG. 5B, column 4 contains a cross-reference to a value in the table in FIG. 5D, and column 5 contains frequency information. The frequency information would presumably be updated on an on-going basis, effectively storing the number of "hits" for each item/parameter/value combination. In addition, there will advantageously be an additional record for each item/parameter pair, collecting frequency information for all values for that item and parameter.

Operation of a system using tables of FIGS. 5A–5K should be readily apparent to those skilled in the art. For example, for a user seeking information as opposed to a user adding information to the system, a typical scenario may be as follows. After the user has chosen an item classification, and perhaps a geographical classification, the system scans through the Main Frequency table as in FIG. 5K, selecting records corresponding to that item classification. The system then displays the corresponding parameters that can be selected for the first of eight parameter choices, along with corresponding frequency information as discussed above with respect to FIG. 2. If the user chooses to limit the number of records according to a value or value range for that parameter, then the system will display the corresponding values along with respective frequency information for each value displayed. The same applies to up to seven additional parameter choices or parameter/value pair choices employed by the user. Once the parameter choices and parameter/value pair choices have been entered, the system searches through Main Data Table as in FIG. 5J for records that match the parameters and values chosen by the user, and displays the corresponding records, if any. The user can then further modify the search, such as by sorting the results or altering the search parameters, or jump to a more detailed display screen (not shown) to display vendor or other additional information on a particular record.

Adding information to the system is contemplated to be accomplished in an analogous manner, except that the user should have interface subwindows (not shown) that permits addition of new classification text, parameters, values, vendors, and so forth.

In short, it should be immediately apparent from the above discussion that this system is a significant improvement over previously known wide access database systems, and especially over previously known publicly modifiable database systems. It allows users to quickly and efficiently access hundreds of thousands or even millions of records, and still find only those few records that are relevant. Even more importantly, the system allows users to add data and search for items according to parameters which are at the same time open to supplementation, but tending to be limited by the choices of others.

Thus, a self-evolving, self-enforcing database has been described herein. While specific embodiments and applications of this invention have been shown and described, it would be apparent to those skilled in the art that many more modifications are possible without departing from the inventive concepts herein. Among other things, for example, the concepts discussed herein can be employed in narrow access databases, such as those directed to employees or customers of a single company. The invention, therefore, is not to be restricted except in the spirit of the appended claims.

What is claimed is:

1. A method of storing marketplace information for multiple types of items in a database, comprising:

providing a user with a first data entry interface for selecting an item classification;

providing the user with a parameters list that displays a plurality of parameters previously related to the item classification by a plurality of previous users during a process of loading item descriptions;

providing a second data entry interface that allows the user to add an additional parameter to the parameters list; and providing a third data entry interface that allows the user to associate individual parameters from the parameters list with individual values from a values list; thereby describing an item falling within the item classification as a set of parameter-value pairs.

2. The method of claim 1 wherein the step of providing a user with a first data entry interface for selecting an item classification comprises displaying classification usage information to the user for use in selecting the item classification.

3. The method of claim 2 further comprising displaying parameter usage information to the user for use in selecting the individual parameters from the parameters list.

4. The method of claim 3 further comprising: providing the user with a hierarchical access to the list.

5. The method of claim 3 further comprising displaying value usage information to the user for assist in selecting the individual values from the values list.

6. The method of claim 2 wherein the step of providing a user with a first data entry interface for selecting an item classification comprises selecting the item classification from a categorization scheme in which classifications are overlapping.

7. The method of claim 1 further comprising displaying historical parameter usage information to the user for use in selecting the individual parameters from the parameters list.

8. The method of claim 1 further comprising displaying historical value usage information to the user for assist in selecting the individual values from the values list.

9. The method of claim 1 further comprising:

providing the user with a hierarchical access to the item classification.

10. A method of indexing an item on a database, comprising:

providing the database with a structure having a plurality of item classifications, parameters, and values, wherein individual parameters are independently related to individual item classifications, and individual values are independently related to individual parameters;

guiding the user in selecting a specific item classification for the item from the plurality of item classifications;

storing the item on the database as a plurality of user-selected item classification/parameter value combinations; and guiding the user in selecting at least one of (a) the parameters of the combinations by displaying relative historical usage information for a plurality of parameters previously used by other users, and (b) the values of the combinations by displaying relative historical usage information for a plurality of values previously used by other users.

11. The method of claim 10 further comprising:

guiding the user in selecting the parameters of the combinations by displaying relative historical usage information for a plurality of parameters previously used by other users with respect to the specific item classification; and guiding the user in selecting the values of the combinations by displaying relative historical usage information for a plurality of values previously used by other users with respect to corresponding item classifications and parameters.

12. A computer implemented system in which a plurality of items are described as collections of parameter-value pairs, comprising:

an items classification set having a plurality of item classifications;

a parameters set having a plurality of parameters;

a first interface for selecting an item classification from the items classification set, wherein the selected item classification has a previously stored relationship to a subset of the parameters set;

a second interface that prompts a user to describe an item of the plurality of items by selecting a parameter from the subset of the parameters set, and from historical usage information regarding the subset of the parameters set;

a values set having a plurality of values, wherein a subset of the values set has a previously stored relationship with the selected parameter;

a third interface that prompts the user to select a value from the subset of the values set;

thereby describing the item at least in part by a relationship among the selected item classification, the selected parameter, and the selected value.

13. A computer implemented system for indexing, comprising:

a set of previously existing subsets, each subset containing an item member, a parameter member, and a value member;

an interface for adding a new subset to the set of previously existing subsets, the new subset containing a selected item member, a selected parameter member, and a selected value member;

a first interface prompting for selection of the selected item member by presenting a list of items that are members of any of the previously existing subsets;

a second interface prompting for selection of the selected parameter member by presenting a list of parameters that arc members of any of the previously existing subsets containing the selected item member, and presenting historical usage information for the list of parameters;

a third interface prompting for selection of the selected value member of the new subset by presenting a list of values that arc members of any of the previously existing subsets containing the selected item member and the selected parameter member, and presenting historical usage information for the list of values.

\* \* \* \* \*